No. 773,135. PATENTED OCT. 25, 1904.
C. G. FANCHER.
DIAL FOR COMPUTING SCALES.
APPLICATION FILED MAY 13, 1903.
NO MODEL. 3 SHEETS—SHEET 1.

Witnesses.

Inventor.
CHARLES G. FANCHER
By Atty. N. DuBois

No. 773,135. PATENTED OCT. 25, 1904.
C. G. FANCHER.
DIAL FOR COMPUTING SCALES.
APPLICATION FILED MAY 13, 1903.
NO MODEL. 3 SHEETS—SHEET 2.

Witnesses.
G. C. Carruthers
Julia Tarrent

Inventor.
CHARLES G. FANCHER
By Atty. N. DuBois.

No. 773,135. PATENTED OCT. 25, 1904.
C. G. FANCHER.
DIAL FOR COMPUTING SCALES.
APPLICATION FILED MAY 13, 1903.

Witnesses.
Ida Feeney
Arthur G. Allen

Inventor.
CHARLES G. FANCHER.
By Atty. N. DuBois

No. 773,135. Patented October 25, 1904.

UNITED STATES PATENT OFFICE.

CHARLES G. FANCHER, OF SPRINGFIELD, ILLINOIS.

DIAL FOR COMPUTING-SCALES.

SPECIFICATION forming part of Letters Patent No. 773,135, dated October 25, 1904.

Application filed May 13, 1903. Serial No. 156,868. (No model.)

*To all whom it may concern:*

Be it known that I, CHARLES G. FANCHER, a citizen of the United States, residing at Springfield, in the county of Sangamon and State of Illinois, have invented certain new and useful Improvements in Dials for Computing-Scales, of which the following is such a full, clear, and exact description as will enable others skilled in the art to which it appertains to make and use my said invention.

My invention relates to scales of that class in which the weight placed upon the scales operates an indicating device to point out the value, both computed and arbitrary, collectable on parcels of any and every weight within the scope of the scales and based on a standard table of rates.

My invention is designed primarily for use in determining the amount of express charges or the amount of freight collectable in accordance with the standard tables of express rates or freight rates, as the case may be.

The purpose of my invention is to provide a dial so constructed and arranged that the face-plate of the dial will show all of the standard rates per hundred pounds for all merchandise except printed matter and will indicate the charge collectable for printed matter at the rate established therefor, the face of the dial also showing a level or unchangeable rate for all parcels weighing a predetermined number of pounds, and to provide in connection with said face-plate an indicator-plate, arranged to show the weight of the article in pounds and ounces, and also to show the weight of and the amount of charges collectable for printed matter.

With these ends in view my invention consists of the novel features of construction and combinations of parts shown in the annexed drawings, to which reference is hereby made, and hereinafter particularly described, and finally recited in the claims.

My improved dial may be used in connection with any scales of suitable construction. It is therefore unnecessary to describe here the precise form of scales to be used.

Figure 1:
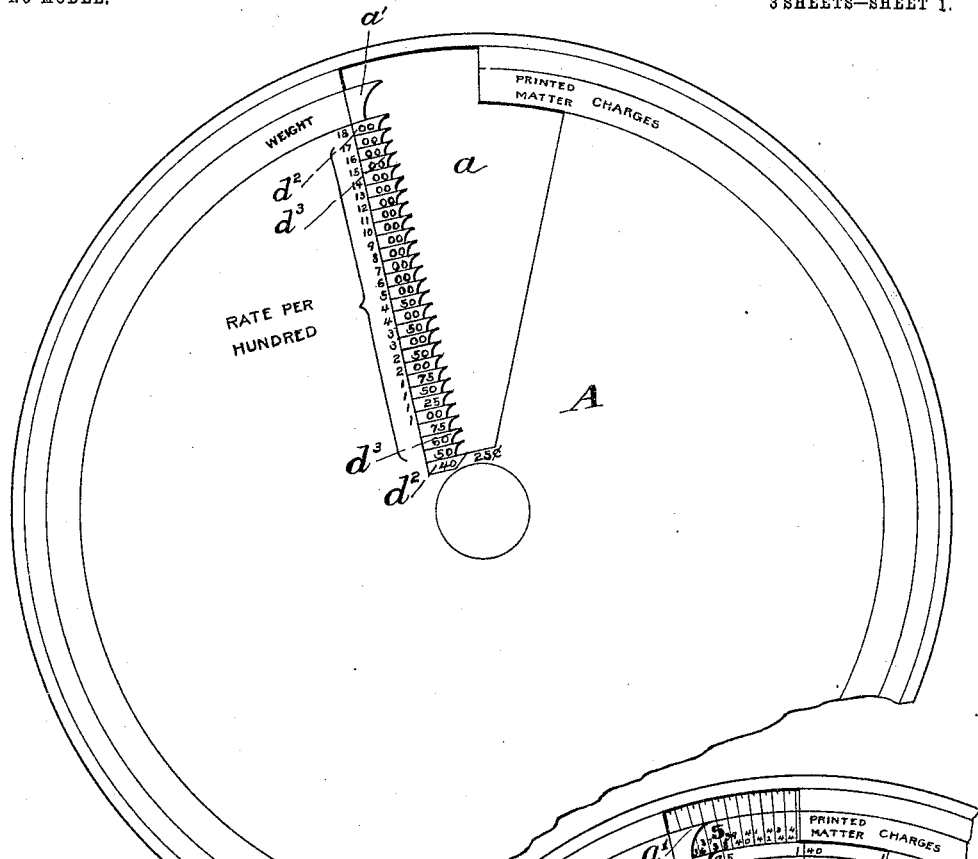
Figure 3:
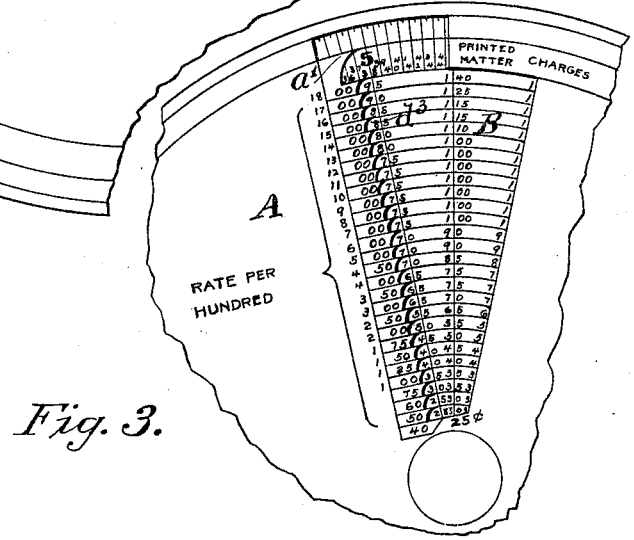
Figure 2:
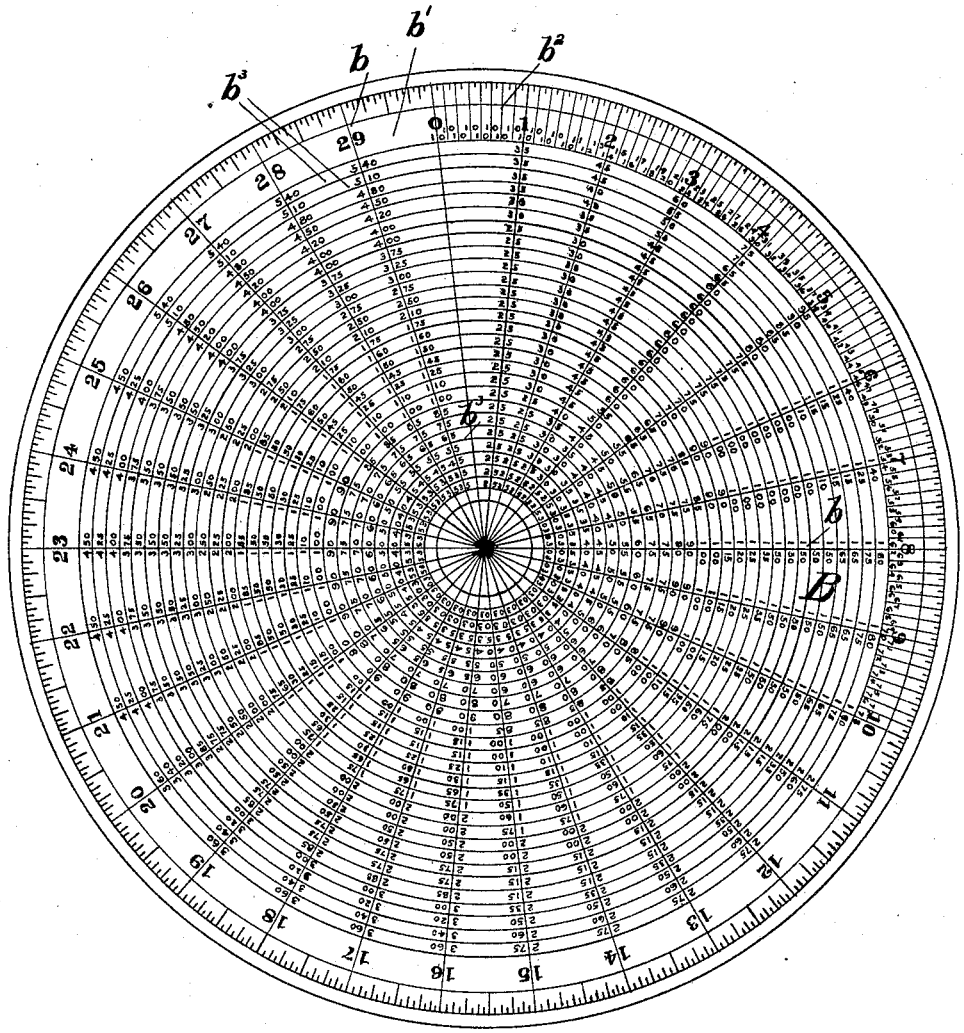
Figure 4:
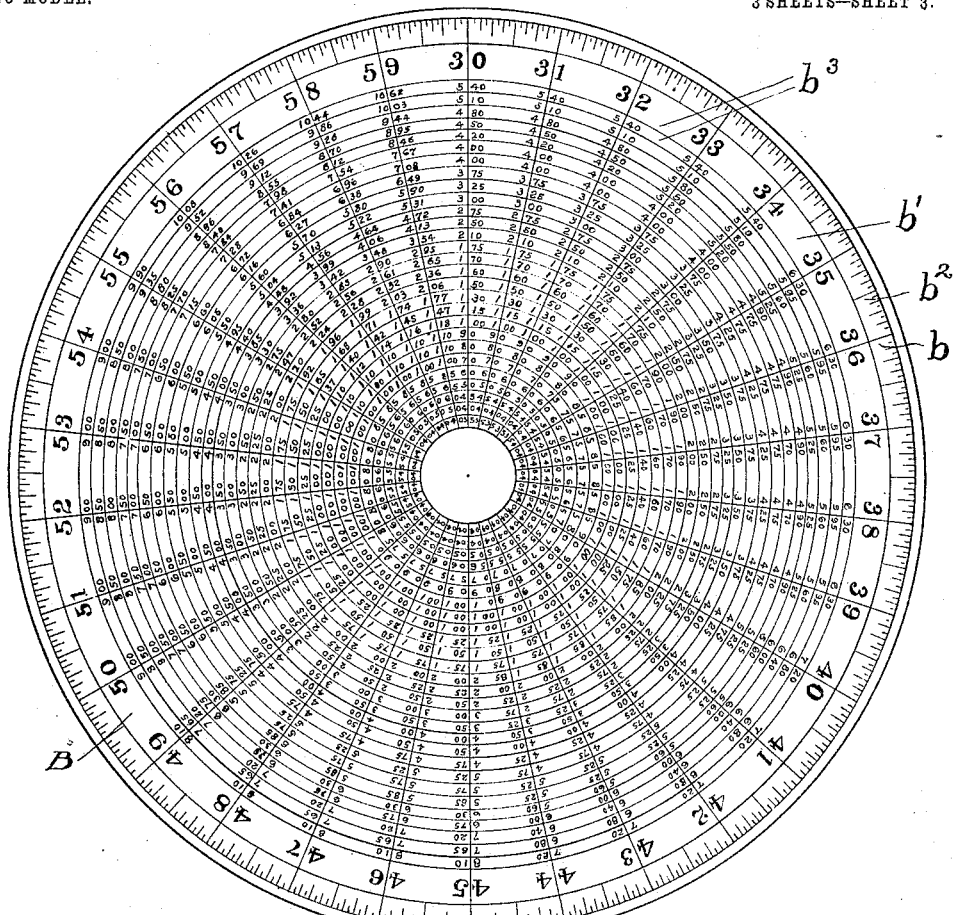

Referring to the drawings, Figure 1 is a plan of the face-plate detached. Fig. 2 is a plan of the indicator-plate detached. Fig. 3 is a partial view showing the face-plate and the indicator-plate in operative relation to each other. Fig. 4 illustrates a modified form of the dial adapted for indicating charges on parcels weighing more than thirty pounds.

Similar reference-letters designate like parts in all of the views.

I will describe the plates separately in detail and will then explain how they are connected and coöperate in attaining the desired result. Both of the plates are preferably made of thin circular sheets of metal; but other suitable material may be used.

The face-plate A has an opening $a$ substantially of the form shown. On one side of the upper part of the opening $a$ is impressed or inscribed the word "Weight" contiguous to the upper or major pointer $a'$, the use of which will be hereinafter more fully explained. On the opposite side near the upper end of said opening are impressed or inscribed the words "Printed-matter charges." Parallel to one edge of the opening $a$ are a series of twenty-eight spaces $d^2$, containing numerals "40" to "1800," indicating the rate per hundred pounds arranged in the order shown, said numerals being included in a brace contiguous to which are inscribed the words "Rate per hundred." The rates per one hundred pounds inscribed on the face-plate embrace all of the rates found in the standard table of rates. At the outer extremities of the spaces $d^2$ are pointers $d^3$, which respectively register with the corresponding concentric circles on the indicator-plate, as hereinafter explained. At the lower end of the opening $a$ is inscribed the flat rate "25¢."

The indicator-plate B is circular and has a series of thirty equidistant radial lines $b$, dividing the face of the plate into thirty equal sectors. These sectors are numbered "0" "1" "2" "3," &c., to "29," and indicate the number of pounds necessary to be placed on the scales to make the designating numbers of the charge values of the sectors visible through the opening $a$ in the face-plate. Near the perimeter of the plate the distance between each pair of radial lines is subdivided into sixteen spaces, each space representing an ounce. The pound-indicating numerals "0"

"1" "2," &c., occupy a circular space $b'$, wider than the space containing the other figures on the plate. Beginning at "0" and extending to the right ten divisions all the spaces $b'$ are divided by radial lines $b^2$, each subdivision of the spaces $b'$ representing two ounces. It is obvious, however, that other aliquot subdivions may be used. The printed-matter rate applies only to parcels weighing ten pounds or less. The subdivisions of the spaces $b'$ being necessarily restricted in size it is found convenient to place in these spaces a double row of figures, each applying alternately to the subdivisions of the spaces. A series of concentric circles $b^3$ on the indicator-plate respectively register with the minor pointers $d^3$ on the face-plate. In the spaces between the circles $b^3$ are inscribed numerals which show the charge values or amounts collectable as charges, these charge values, some of which are computed at the rates shown on the face-plate and some of which are arbitrary, are arranged in radial columns respectively corresponding to the pound-designating numerals "1" to "29," inclusive, and are arranged to correspond to the rates per hundred shown on the faceplate of the dial. To avoid mistakes in reading the numbers, the first integer of each charge value is placed on the left-hand side of the radial line and the remaining integer or integers are placed on the right-hand side of the same line.

When the members are assembled in operative relation to each other, as shown in Fig. 3, the face-plate is stationary and the indicator-plate is situated concentric thereto and is connected with the scales, with which the dial is usable, so that a weight placed on the scales will turn the indicator-plate to such extent that the pound-indicating numeral corresponding to the weight will be visible through the upper part of the opening $a$ contiguous to the pointer $a'$.

The dial herein shown and described is arranged to compute the charges on parcels not exceeding thirty pounds in weight. Obviously the scope of the dial may be increased to make it available for computing charges on parcels of greater weight—that is to say, the maximum weight indicated on the indicator-plate shown may be made the minimum weight on another plate of the same character and dimensions. The first plate then would compute for weights for thirty pounds or less and the second plate would compute for weights from thirty pounds to sixty pounds, and so on to any desired extent.

Under the schedule on which the dial is based all parcels rated at forty cents per hundred and weighing less than thirty pounds go at the uniform charge of twenty-five cents, as indicated by the character "25¢" inscribed at the inner end of the opening $a$. This expedient avoids the necessity for inscribing the numerals "25" in each of the thirty restricted divisions nearest the center of the plate. This feature is of practical advantage, because the flat rate-price "25¢" inscribed on the faceplate is easily legible, whereas if the figures were inscribed in each of the thirty spaces on the indicator-plate the figures would be too small to be easily read.

It is the practice among transportation companies where the weight of a parcel exceeds the pound the charge attachable to the next higher pound governs. For example, if a parcel weighs, say, nine pounds and two ounces, the charge instead of being for nine pounds would be for ten pounds. The pointers $a'$ and $d^3$ serve to accurately determine whether or not the pound limit is exceeded in any particular case. If the pointers project across the radial lines on the indicator-plate, then the next higher pound-numeral designates the radial column in which the charge is to be found. The scope of the movement of the indicator-plate under the pointer $a'$ being greater than that under the pointers $d^3$, the pointer $a'$ will more certainly indicate the movements of the indicator-plate, and in doubtful cases will determine the charge; but in ordinary use the pointers $d^3$ will more conveniently indicate the charge.

In practice it sometimes happens that the printed-matter charge is greater than arbitrary merchandise charge for a parcel of the same weight. In that case the shipper desires to avail himself of the cheaper rate. My device is so constructed and arranged that it will indicate both the printed-matter charges and the merchandise charges collectable on a parcel of any given weight within the scope of the device. For example, if it be desired to forward a printed-matter parcel weighing, say, seven pounds to a destination for which the merchandise rate would be forty cents per hundred pounds, the printed-matter charge on that parcel would be fifty-four cents, whereas the flat-rate merchandise charge for the same parcel would be only twenty-five cents. For that destination, then, it would obviously be to the sender's advantage to bill the parcel as merchandise. If, however, the parcel be destined to a point for which the rate is eighteen dollars per hundred pounds, (the highest rate,) the merchandise charge on the same parcel would be one dollar and forty cents; but the printed-matter charge would be fifty-four cents, the same as before. It would then be to his advantage in the latter case to bill the parcel as printed matter.

A great practical advantage of my device is that it simultaneously indicates the arbitrary merchandise charges collectable and the printed-matter charges collectable, so that the user can at a glance determine which rate is more to his advantage.

The operation of the device is as follows: Referring to Fig. 3, it will be seen that the pound-designating numeral "5" is visible through the opening $a$ in the plate A contiguous to the word "weight," which indicates a weight of five pounds on the scales. If then it is desired to ascertain the charge on five pounds at the rate of seven dollars per hundred pounds, it is only necessary to read the number in the radial column of the indicator-plate contiguous to the pointer $d^3$ at the space containing the rate "700." In this case the charge would be seventy-five cents, and so on for any of the rates contained on the face of the dial-plate except the forty-cent rate. In that case the charge would be twenty-five cents, as already explained. In the case of printed matter the drawing shows the numeral "5" through the dial-plate as indicating five pounds. The charge then at the printed-matter rate would be thirty-eight cents, as indicated by the numerals "3" "8," one on each side of the short radial line crossing the space $b'$, contiguous to the word "weight." The pointer $a'$ designates both the weight and the charge for printed matter. The operation of course would be the same for any other weight within the scope of the dial. If two ounces were added to the five pounds already on the scales, then the indicator-plate would be turned so that the pointer $a'$ would extend across the radial line 5, in which case the six-pound charge would be collectable. In this particular case the charge would be one dollar for merchandise and for printed matter thirty-nine cents.

I am aware that a stationary face-plate and a concentric turnable indicator-plate have heretofore been used in connection with the computing-scales. I therefore do not claim that construction broadly.

Having fully described my invention, what I claim as new, and desire to secure by Letters Patent, is—

1. In a device of the class described, the combination of a face-plate having inscribed thereon all of the standard express rates per hundred pounds for merchandise, in combination with an indicator-plate divided by radial lines into a series of sectors numbered to designate the number of pounds to be placed on the scale with which the device is usable to cause the charge values inscribed in said sectors respectively to register with the rates per hundred pounds inscribed on said face-plate, said sectors containing all of the merchandise charge values, both computed and arbitrary, based on each of the several rates shown on said face-plate, for all weights within the scope of the indicator-plate, said indicator-plate and face-plate coöperating to bring the charge values on the indicator-plate into registry with the standard rates on the face-plate, to indicate the charge collectable on any parcel of a weight within the scope of the indicator-plate, from any and every initial point to any and every destination covered by the standard table of rates, as set forth.

2. In a device of the class described, the combination of the face-plate having inscribed thereon all of the standard express rates per hundred pounds for merchandise, also having a pointer; in combination with an indicator-plate having sectors numbered to designate the number of pounds necessary to be placed on the scale with which the device is usable to cause the charge values inscribed in said sectors respectively to register with the rates per hundred pounds inscribed on said face-plate, said sectors also containing all of the charge values both computed and arbitrary for merchandise, based on the rates inscribed on said face-plate; said indicator-plate also having subdivisions to designate ounces and half-ounces, said subdivisions being registerable with the pointer of said face-plate, and having inscribed computed printed-matter charges, the merchandise charge values of said indicator-plate being registerable with the rates per hundred pounds on the face-plate and the computed printed-matter charges on said indicator-plate being registerable with the pointer on the face-plate, to indicate both the amount collectable as printed-matter charges and the amount collectable as merchandise charges for the weight indicated by the pointer, as set forth.

3. A stationary face-plate having an opening as described, also having inscribed thereon characters designating the flat rate for all parcels weighing less than a predetermined number of pounds, at the minimum rate inscribed on said face-plate; in combination with an indicator-plate having sectors respectively designated by numerals, said indicator-plate being turnable to expose the numerals thereon through the opening in the face-plate, as set forth.

In witness whereof I have hereunto subscribed my name, at Springfield, Illinois, this 23d day of April, 1903.

CHARLES G. FANCHER.

Witnesses:
J. L. FITZ GERALD,
MAY F. RYAN.